Figure 1:
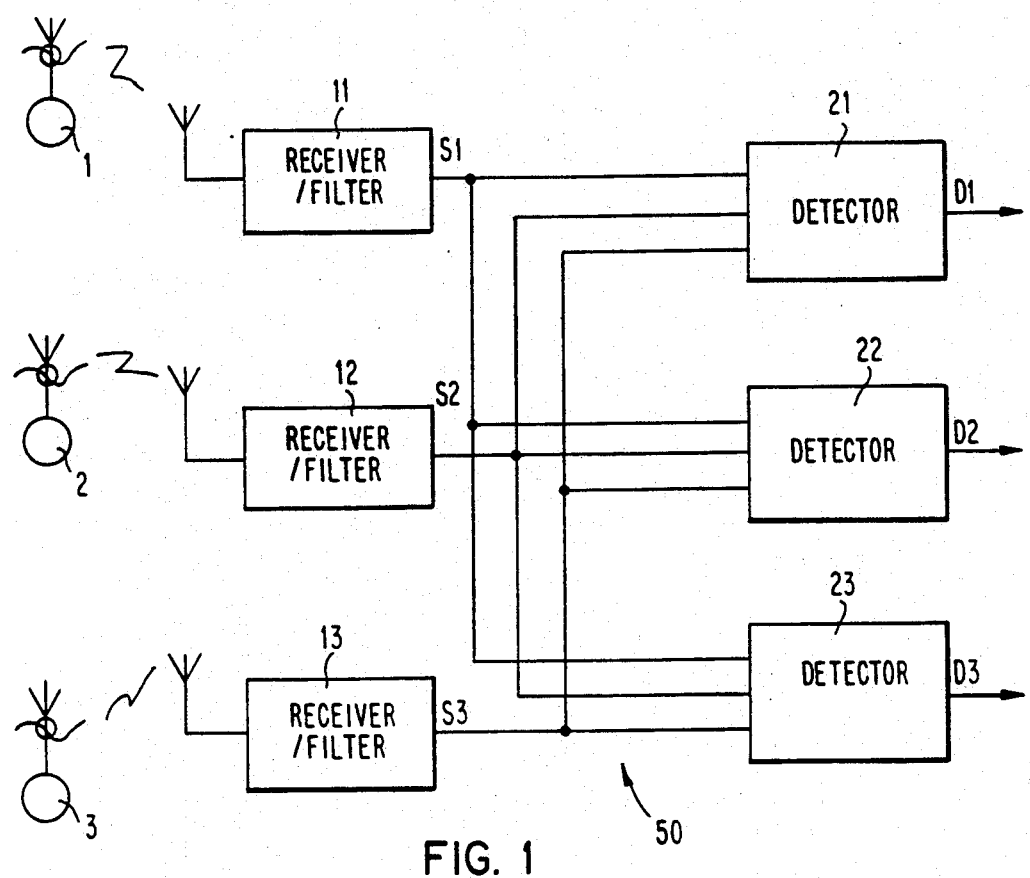

United States Patent [19]

Gouhier-Beraud

[11] Patent Number: 5,218,300
[45] Date of Patent: Jun. 8, 1993

[54] METHOD AND EQUIPMENT FOR NOISE-REDUCTION WHEN DETECTING A TARGET BY MEANS OF A SYSTEM OF SEVERAL DETECTOR ELEMENTS

[75] Inventor: Patrick Gouhier-Beraud, Drôme, France

[73] Assignee: Sextant Avionique, Cedex, France

[21] Appl. No.: 827,318

[22] Filed: Jan. 29, 1992

[30] Foreign Application Priority Data

Jan. 31, 1991 [FR] France ................................ 91 01092

[51] Int. Cl.$^5$ .......................... G01V 3/08; G01V 3/38; G01V 3/40
[52] U.S. Cl. ..................................... 324/345; 324/72; 324/326; 324/244; 328/167
[58] Field of Search ...................... 324/72, 207.26, 244, 324/247, 260, 301, 326, 331, 334, 344, 345; 342/458, 459, 465; 328/165, 167

[56] References Cited

U.S. PATENT DOCUMENTS

| | | |
|---|---|---|
| 3,490,032 | 1/1970 | Zurflueh . |
| 3,808,519 | 4/1974 | Lemercier et al. . |
| 4,277,771 | 7/1981 | Chapin et al. . |
| 4,766,385 | 8/1988 | Polvani ................................ 324/345 |

FOREIGN PATENT DOCUMENTS 0190789 11/1983 Japan .................................... 324/345

OTHER PUBLICATIONS

McAulay, "Computerized Model Demonstrating Magnetic Submarine Localization", *IEEE Transactions on Aerospace and Electronic Systems*, vol. AES-13, No. 3, May 1977, pp. 246-254.

*Primary Examiner*—Gerard R. Strecker
*Attorney, Agent, or Firm*—Lowe, Price, LeBlanc & Becker

[57] ABSTRACT

The detector elements are sensitive to the target presence in their respective vicinities and are distributed in the surveillance zone. First differences (S1−S2, S3−S2, S4−S2) are formed from outputs of the detector elements taken pairwise, and at least one other first difference (S3−S2, S4−S2) previously filtered in a filter (213, 213') is subtracted from each first difference (S1−S2) to form a second difference, where said filter is controlled to minimize the value of the second difference in the absence of a target, and the second differences so obtained are used (216) to detect the target. In particular the invention applies to detecting submarines using magnetometer buoys.

9 Claims, 4 Drawing Sheets

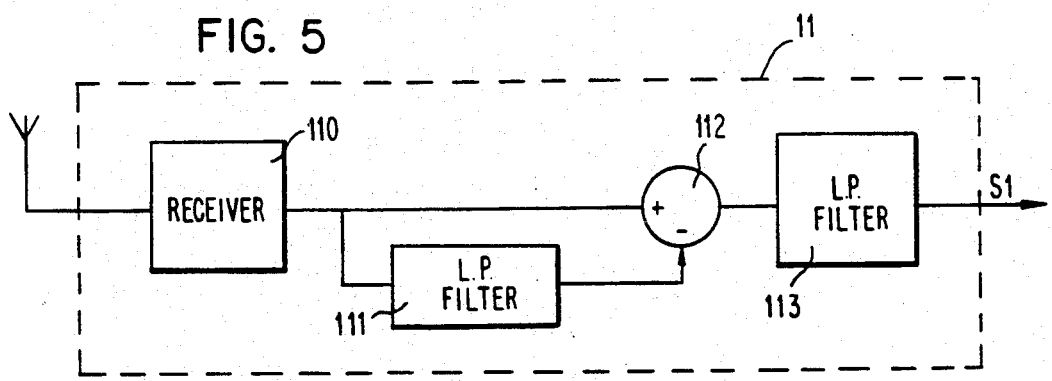
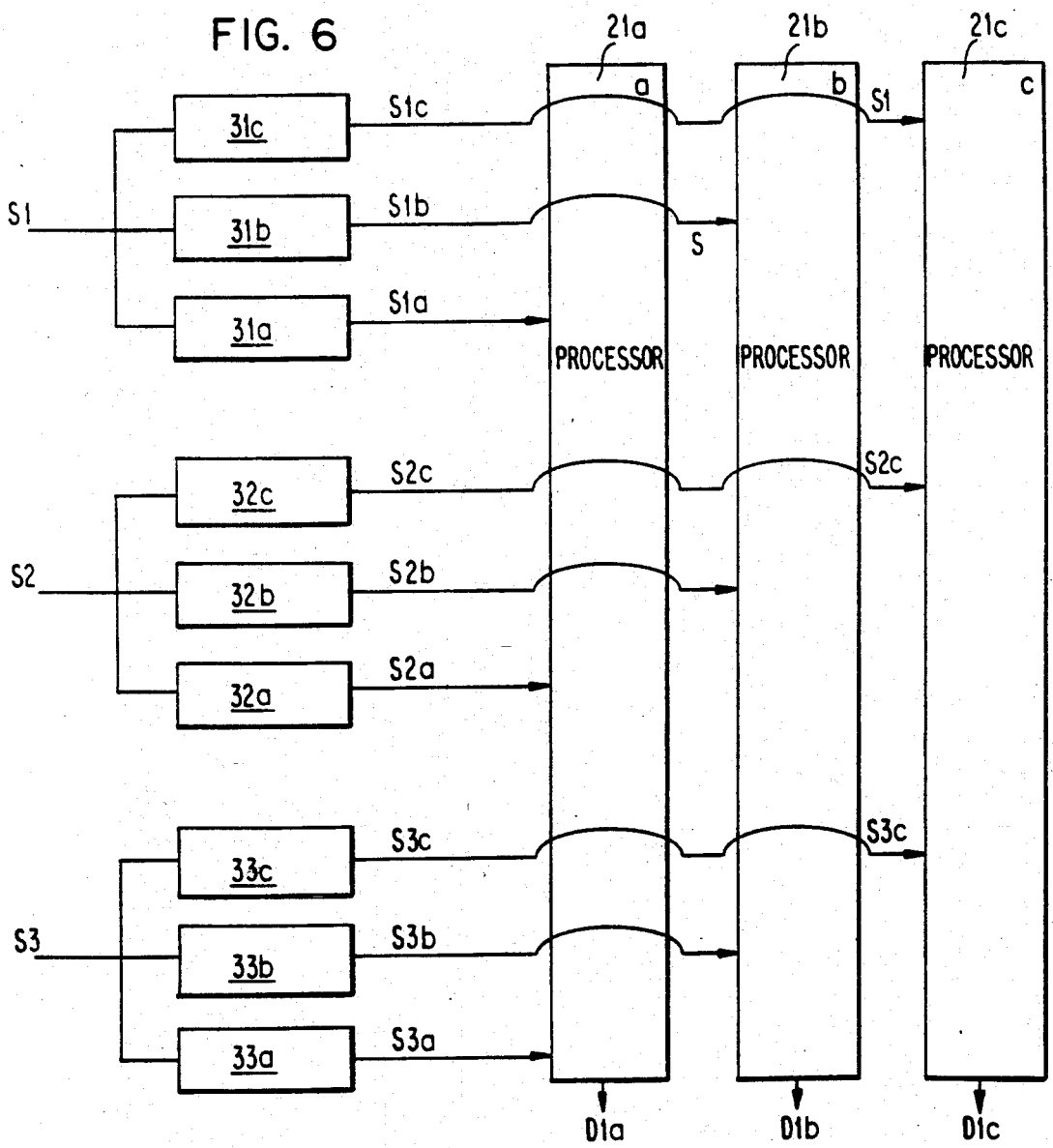

METHOD AND EQUIPMENT FOR NOISE-REDUCTION WHEN DETECTING A TARGET BY MEANS OF A SYSTEM OF SEVERAL DETECTOR ELEMENTS

The foremost object of the present invention is a method of noise-reduction for target detection by a system with a plurality of detector elements sensing the target's presence in their respective vicinities and distributed across a surveillance zone.

The invention is applicable in particular to the presence of one or more surface or submarine vessels in a zone being monitored, using a plurality of buoys illustratively linked by radio to a central system. Illustratively each buoy may be a magnetometer buoy comprising a magnetic resonance magnetometer responding to the magnetic field in which it is immersed and therefore sensitive to the perturbations of the earth magnetic field resulting from the presence of a submarine near the particular buoy. The central system is located either aboard a plane or on the ground when the surveillance zone is not too remote from the shore, or it may also be on a "master" buoy centralizing and processing the signals from the other buoys, called "slave" buoys.

The surveillance zone may be a line which is monitored for being crossed, or not, by one or several submarines. In this case the buoys are arranged to form a barrier along this line. The surveillance zone also may be an area, and in that event the buoys are arrayed as a closed barrier along the periphery of the surveillance zone, and where called for further buoys are present inside the area.

In the case of magnetometer buoys and submarines, the problem of noise-reduction arises the more acutely the weaker the earth magnetic-field perturbation by a submarine, and the more likely the signal, i.e. this perturbation, is likely to be obscure by the noise.

A noise-reduction method is known whereby the output signal of a neighboring buoy, after having been filtered in an adaptive filter, is subtracted from the output signal of each of the buoys or detector elements. The adaptive filter is controlled in such a way that when no submarine is near the two buoys, the difference of the buoy output signal and the filtered output signal from the neighboring buoy shall be as low as possible.

However this method provides only a marginal noise reduction, so that submarine detection is impaired on occasion.

The object of the present invention is to address this problem.

For that purpose, the object of the invention is a method of noise reduction when detecting a target by a system of at least three detector elements sensitive to the presence of the target in their respective vicinities, said elements being distributed in the surveillance zone, said method being characterized in that first differences are formed from the outputs of the detector elements taken pairwise, to achieve a second difference, at least another first difference previously filtered in a filter is subtracted from the initial first difference to form a second difference, said filter being controlled to minimize the second difference in the absence of a target, and the second differences so achieved are used to detect the target.

In the method of the invention, noise reduction is achieved somewhat in the manner of the prior art, namely in that the filtered output signal of another detector element is subtracted from the output signal of a detector element under consideration. However applicant conceived of using the differences of the outputs from the detector elements instead of the outputs themselves. Indeed applicant observed that a large part of the noise interfering with the signal from a detector element applied to all detector elements, especially when fairly close to each other. In the prior art, much of the purpose of filtering and of subtracting the filtered output is to eliminate the common noise. Nevertheless these remains noise of relatively significant levels. The method of the invention, where the noise processing involves differences, or gradients of the outputs of the detector elements, results in processing outputs free of the common part, so that the residual noise is much less and more reliable detection and more accurate target location shall be achieved.

Advantageously said filter shall be an adaptive filter of which the coefficients are controlled in relation to the value of the second difference formed by means of said filter, and the values of these coefficients shall be fixed the moment a target presence shall be sensed in response to this second difference.

In this case, allowance is made that there may be some coherence between the outputs of the various detector elements in the presence of a target, that is, that there always may be some signal in the outputs from the elements used to form the first differences filtered in the adaptive filter.

In advantageous manner, when the plurality of detector elements is more than three detectors, three neighboring detectors elements are formed into a set and for each set three first differences are formed, and from each of such first three differences, another of the first differences—after having been filtered in a controlled filter to minimize the value of the corresponding second difference—shall be subtracted.

In this case, the equipment implementing the invention is easily adopted to different numbers of detector elements because the invention includes a plurality of identical devices each processing the outputs of a subset of three detector elements.

In one feature of the invention, slow variations in the output of each detector element are eliminated by calculating a moving average of this output from which then is subtracted the moving average so calculated.

This elimination of the slow variation, or drift, of the output signal is especially useful when the detector elements are magnetometer buoys.

In another feature of the invention, the output from each detector element is resolved by frequency filtering into a plurality of elementary outputs each occupying an elementary band lower in frequency than that of said output signal, each of the elementary outputs is sub-sampled and the sub-sampled elementary outputs occupying the same elementary frequency band are processed separately.

In this case, and as shall be explained below, it is easier to arrive at a satisfactory compromise for the sampling frequency in each elementary band.

In yet another feature of the invention, the target is detected by means of the second difference in that a set of possible target trajectories relative to the corresponding detector element is selected, the received signal is projected onto a set of basic functions relating to each of these trajectories, the expected energy for each trajectory is calculated, and each of these expected energies is compared with a low threshold.

Moreover the object of the present invention is to provide equipment for implement the above method for reducing noise when detecting a target by a system comprising a plurality of at least three detector elements sensitive to the presence of the target in their respective vicinities and distributed in a surveillance zone, said equipment comprising means for forming first differences from the outputs of the detector elements taken pairwise, means to subtract at least another first difference previously filtered in a filter from each first difference in order to obtain a second difference, said filter being controlled to minimize the value of the second difference in the absence of the target, and means sensing the target in relation to said second difference.

The present invention shall be illustrated in relation to the description below of several implementations of the method of the invention and several devices according to preferred embodiments of the invention, referring to the attached drawings.

Figure 2:
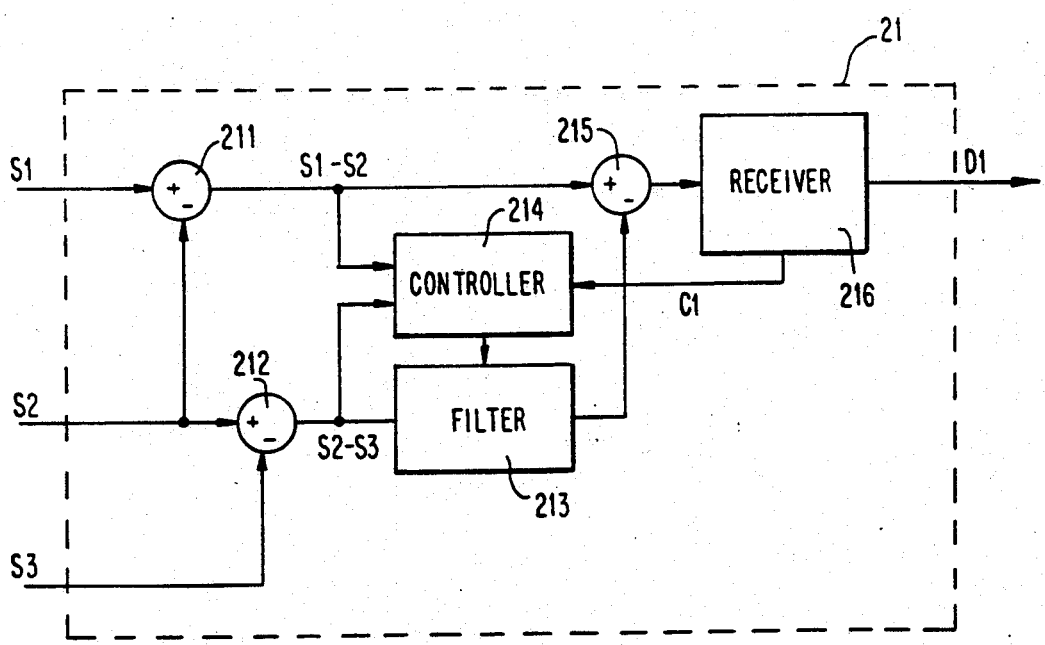
Figure 3:
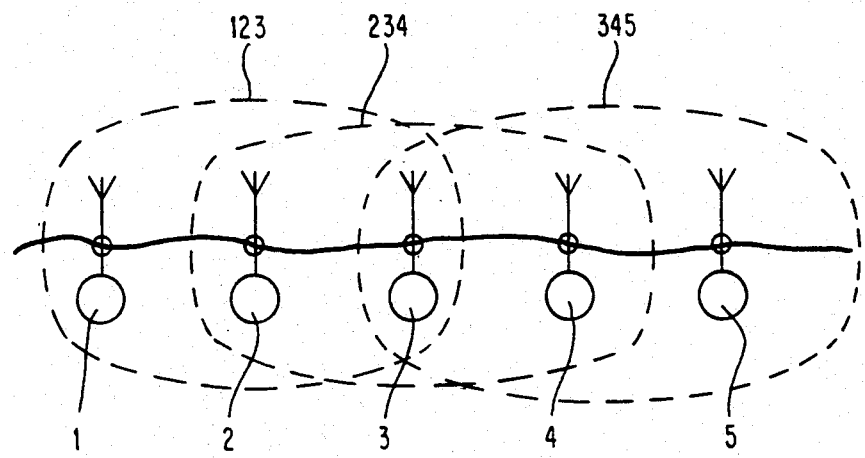
Figure 4:
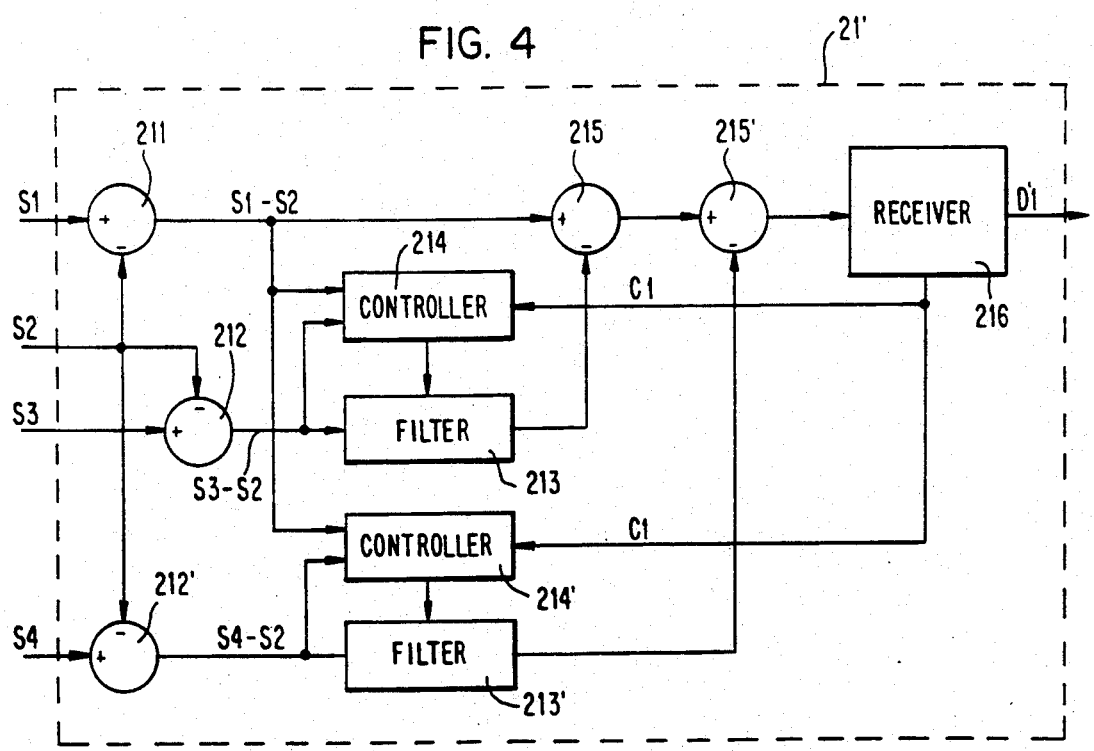
Figure 7:
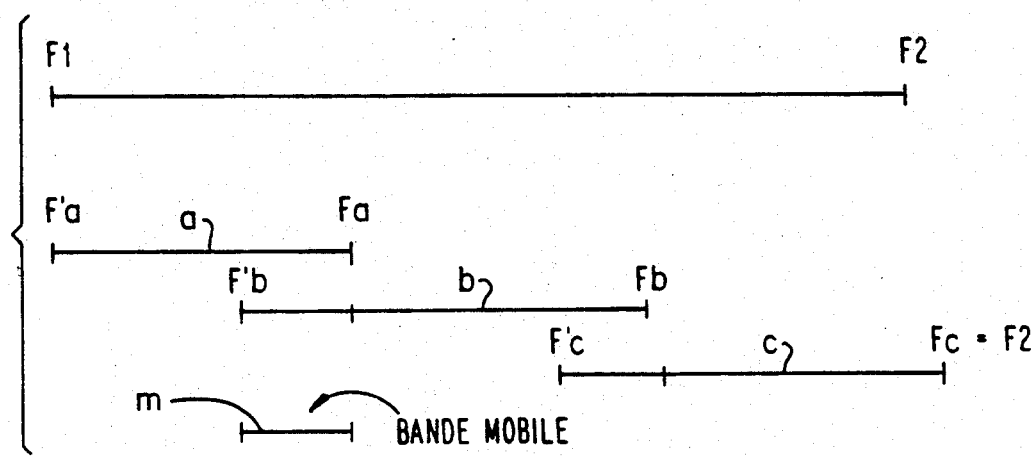
Figure 8:
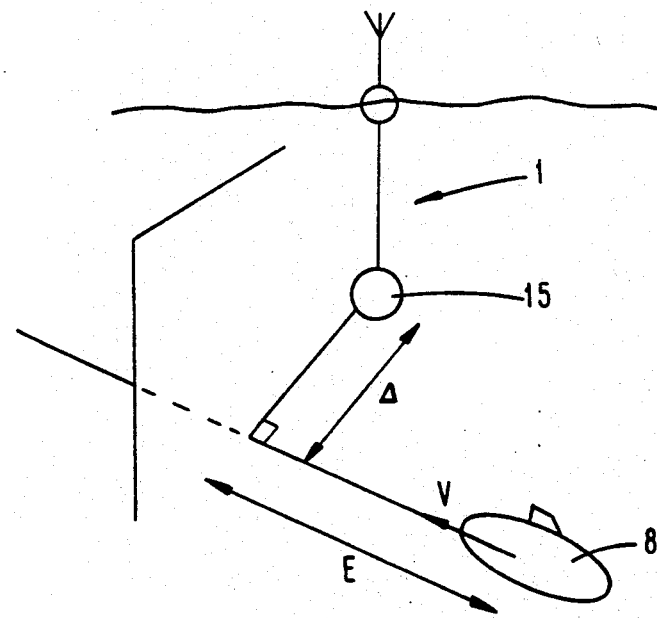

FIG. 1 is a block circuit diagram of a submarine detection system using magnetometer buoys, FIG. 2 is a more detailed schematic of one of the circuits for noise reduction and detection shown in FIG. 1, FIG. 3 schematically shows a buoy barrier which can be used in a system such as shown in FIG. 1, FIG. 4 is a variation of the noise-reduction circuit of FIG. 2, FIG. 5 is a schematic of one of the receiving and filtering circuits of the system of FIG. 1, FIG. 6 is a block circuit diagram of a variation of the system of FIG. 1 implementing separation into frequency channels, FIG. 7 is a schematic of the frequency bands of the various frequency channels used in the system of FIG. 6, and FIG. 8 is a magnetometer buoy in the presence of a submarine.

Referring to FIG. 1, the detection system shown therein is for submarines and comprises a plurality of magnetometer buoys 1, 2 and 3 and central equipment 50 receiving the signals picked up by the buoys 1, 2 and 3 which in this case are radio-transmitted.

As already mentioned, the central equipment may be aboard a plane, or on ground, or aboard a master buoy (omitted), in the latter case the buoys 1, 2 and 3 then being slave buoys.

The central equipment 50 comprises three circuits 11, 12 and 13 for receiving and filtering. These three circuits are identical and each is associated with one of the three buoys. Circuit 11 is associated with the buoy 1 and emits an output S1 representing the magnitude of the magnetic field in which the buoy 1 is located. Similarly the circuit 12 and the circuit 13 resp. emit outputs S2 and S3 showing the magnitude of the magnetic field in which the buoys 2 and 3 are located.

The equipment 50 furthermore comprises three circuits 21, 22 and 23 for noise reduction resp. emitting outputs D1, D2 and D3. Each of the circuits 21, 22, 23 comprises three inputs receiving the outputs S1, S2, S3.

As elucidated below, the signal D1 represents the presence of a submarine near the buoy 1, and signals D2 and D3 indicate the presence of a submarine resp. near buoys 2 and 3.

As regards FIG. 2, circuit 21 comprises a first subtractor 211 receiving the output S1 at its positive input + and the output S2 at its negative input −. The output from the first subtractor 211 represents therefore the difference S1−S2. The circuit 21 comprises a second subtractor 212 which here receives the output S2 at its positive input + and the S3 output at its negative input −. Therefore the output from the second subtractor 212 is the difference S2−S3 which is applied to the input of an adaptive filter 213 of which the coefficients are set by a control circuit 214. The control circuit 214 receives the outputs from the first and second subtractors 211 and 212 reps. and also an output C1 from an auxiliary terminal of a detection circuit 216.

A third subtractor 215 comprises a + input connected to the output of the first subtractor 211, a − input connected to the output of the filter 213 and an output connected to the single input of the detection circuit 216.

The detection circuit 216 comprises a main output for the signal D1.

Circuits 22 and 23 are omitted but identical with the circuit 21, however their inputs S1, S2 and S3 are circularly permutated. Accordingly the inputs S3, S2 and S1 resp. replace in circuit 22 the inputs S1, S2 and S3 of the circuit 21. Similarly, the inputs S3, S1, S2 resp. replace in circuit 23 the signals S1, S2 and S3 of circuit 21.

The system described above in relation to FIGS. 1 and 2 operates as follows:

As long as circuit 216 does not detect the presence of a submarine target near the buoy 1, it allows—by the intermediary of the C1 signal—the coefficients of the adaptive filter 213 to be set by the control circuit 214 so as to minimize the output from the third subtractor 215.

As soon as the circuit 216 detects the presence of a submarine near buoy 1, it uses the signal C1 and the circuit 214 to fix the coefficient values of the filter 213 in such a way that these coefficients retain the values they had just prior to the detection effected by the circuit 216.

In the invention, and as already mentioned, the residual noise at the output of the third subtractor then shall be particularly low because this third subtractor receives at its positive input + the difference S1−S2 rather than the input S1 itself, and its negative input − receives the filtered difference S2−S3, not the filtered S2 input.

Be it borne in mind that the circuit 21 may be modified so that the first subtractor 211 emits an output representing the difference S1−S3 instead of the difference S1−S2.

The signals of FIG. 2 may be analogue but most of the time they will be digital samplings, with a suitably selected period Te, of analogue signals, the value of each sampling being converted into digital form. In this case and in known manner, S1 for instance is represented by a sequence of digital samplings $$\ldots S1_n, S1_{n+1}, S1_{n+2}, \ldots$$

each representing the digital value of an analogue signal S1(t) at times of order ... n, n+1, n+2 ... resp.

For the sake of simplicity, this digital representation was omitted from the Figures.

FIG. 3 shows a group of five buoys 1,2,3,4,5 to monitor a zone bigger than that of FIG. 1 using buoys of the same sensitivity. In this case, sets of three mutually neighboring buoys can be formed which shall each be processed by equipment similar to equipment 50 of FIG. 1. A first set 123 in this embodiment mode comprises the buoys 1, 2 and 3; a second set 234 comprises the buoys 2, 3 and 4 and a third set 345 comprises the buoys 3, 4 and 5.

However this resolution into three-buoy sets is not only the way of the invention of processing a plurality in excess of three of buoys.

FIG. 4 shows a circuit 21' which is a variation of the circuit 21 of FIG. 2 and which is modified to handle four outputs S1, S2, S3, S4 from four different buoys. This FIG. 4 shows a first subtractor 211 of which the output represents the difference S1−S2, and a second subtractor 212 of which the output here represents the difference S3−S2. This difference is fed to the input of an adaptive filter 213 of which the output is applied to the − input of a third subtractor 215. The + input of the third subtractor 215 receives the output S1−S2 of the first subtractor 211.

A control circuit 214 sets the coefficients of the adaptive filter 213 in response to the output signals of the first and second subtractors 211 and 212 resp. and in response to a signal C1 from the auxiliary output of a detection circuit 216.

Essentially the circuit 21' differs from the circuit 21 in that it furthermore comprises a fourth subtractor 212', an adaptive filter 213', a control circuit 214' and a fifth subtractor 215'.

The purpose of the fourth subtractor 212' is similar to that of the first subtractor 212 except for receiving the S2 and S4 signals and for emitting an output representing the difference S4−S2. This difference is fed to the input of the adaptive filter 213'. The output from the adaptive filter 213' is fed to the-input of the fifth subtractor 215' of which the + input receives the output from the third subtractor 215 and of which the output is fed to the detection circuit 216.

The coefficients of the adaptive filter 213' are set by the control circuit 214' in response to the outputs from the first and fourth subtractors 211 and 212' resp. and to the signal C1.

The circuit 21' operates identically to the circuit 21 except that instead of one, two filtered differences are subtracted from the S1−S2 signal before it is fed to the input of the detection circuit 216. Obviously a fifth signal S5 might be considered, from which the difference S5−S2 would be determined, for instance in order to subtract it, following passage through an additional adaptive filter similar to the filters 213 and 213', from the signal applied to the detection input. In this manner an arbitrary number of signals similar to the signals S1, S2, S3 . . . can be accounted for, a cascade of subtractions similar to the subtractors 215 and 215' being provided.

On the whole, the method of the invention consists in forming first differences from buoy outputs considered pairwise, such as the differences S1−S2, S3−S2, S4−S2 of FIG. 4 and in subtracting at least one other first difference, previously filtered in a filter such as filter 213, from each first difference such as S1−S2, to obtain a second difference such as the one fed to the detection circuit 216, said filter being controlled to minimize the value of the second difference in the absence of the target.

The receiving and filtering circuit 11 will now be described in relation to FIG. 5. The antenna picks up the output from the buoy 1 and is provided at its own output with a receiver circuit 110 such as described in the French patent application 88 02 218. In know per se manner, the buoy includes a coder and transmission-signal processor specifically designed for transmission breaks due to wave masking. The receiver 110 decodes and processes for external processing the received signal, in particular in the receiver circuit 216. In this embodiment the output of receiver 110 is connected to the positive input + of a subtractor 112 and to the input of a circuit 111 computing the moving average. The negative input − of the subtractor 112 is connected to the output of circuit 111 and its output is connected to the input of a low-pass Butterworth or elliptical filter 113. The output of the filter 113 delivers the signal S1.

In this embodiment the circuit 111 and the subtractor 112 form a high-pass filter of which the purpose is to eliminate slow variations in each buoy output, commonly called "drifts".

For that purpose, the circuit 111 computes a moving average using N−1 samples on either side of the time of observation, weighting the N−1 samples so used through a window known as the Hanning window to the expert.

Accordingly the circuit 111 is composed of a low-pass filter, the assembly of the circuit 11 and of the subtractor 112 behaving like a high-pass filter.

Applicant has shown that once the cutoff frequency $f_c$ of the circuit 111 is given, the number N defining the width of the Hanning window must be equal to $$N = 0.66/(T_e F_c)$$

where Te is the sampling period.

The cutoff frequency $f_c$ is related to the expected ratio V/D of speed V to distance D of the target submarines such as defined in FIG. 8. This Figure shows a submarine 8 moving at speed V near a buoy 1 along an assumed rectilinear itinerary. The shortest path between the path of the submarine 8 and the sensitive part 15 containing the magnetometer of buoy 1 is defined as the distance D. This distance D merely is the length of the geometric projection of the sensitive part onto the path of the submarine 8.

Within the 95% of the useful energy of the signature signal of a submarine shown by the applicant being in the frequency band of which the lower limit is V/(2$\pi$D) and the upper limit is (3.5 V)/(2$\pi$D), the cutoff frequency of the high-pass filter consisting of the circuit 111 and the subtractor 112 shall be selected about V/(2$\pi$D) and the cut-off frequency of the low-pass filter 113 is selected to be about (3.5 V)/(2$\pi$D).

As shown by FIG. 6, instead of being directly fed to the circuit 21 as shown in FIG. 2, the outputs S1, S2 and S3 may be filtered to be each resolved or split into several frequency channels, the circuit 21 itself being resolved into as many circuits that process each one frequency channel.

Accordingly the output S1 is resolved by means of three frequency filters 31a, 31b and 31c into three outputs S1a, S1b and S1c resp., each output filling an elementary frequency band and a, b, c resp.

Simultaneously the output S2 is resolved by three frequency filters 32a, 32b, 32c into three outputs S2a, S2b, S2c resp., each output filling an elementary frequency band a, b, c.

The output S3 also is resolved by means of three frequency filters 33a, 33b, 33c into three outputs S3a, S3b and S3c resp. with each output resp. being in the frequency band a, b, c.

A circuit 21a similar to circuit 21 processes the three outputs S1a, S2a, S3a in the band a. Again, a circuit 21b processes the three outputs S1b, S2b, S3b in the band b, whereas a circuit 21c processes the three outputs S1c, S2c, S3c in band c.

The circuits 21a, 21b, 21c emit signals D1a, D1b, D1c resp. corresponding to the detection of a target submarine in the band a, b, c resp.

FIG. 7 shows how the frequency band F1−F2 is resolved into three frequency bands a, b, c having respective low cutoffs F'a, F'b, F'c and respective high cutoffs Fa, Fb, Fc.

The three bands a, b, c sufficiently overlap so that one submarine shall leave its signature totally in one band or the other. In FIG. 7, m denotes the band which can be filled by the signature signal of a submarine. Obviously the band m is less than the band F1−F2 and it may shift inside the band F1−F2 depending on particular features of the submarine generating the signature signal.

Obviously, F'a=F1 and Fc=F2.

On the other hand, as shown by FIG. 7, $$F'b < Fa \quad (3)$$

$$F'c < Fb \quad (4)$$

where $$Fa - F'b > m \quad (5)$$

$$Fb - F'c > m \quad (6)$$

so that the overlap of the bands a, b, c always shall be sufficient.

Moreover, the frequencies F'a, F'b, F'c and the frequencies Fa, Fb, Fc are selected in such a way that frequency dynamics be approximately the same for each of the three bands a,b,c. The frequency dynamics of a band is the ratio of maximum to minimum band frequencies.

The significance of frequency band-splitting is that it allows carrying out sub-sampling in each band a,b,c while ignoring some samplings, instead only considering for instance one sampling in n. In this instance sub-sampling is provided in each of the filters 31a, 31b, 31c, 32a, 32b, 32c, 33a, 33b, 33c.

Sub-sampling is provided to observe Shannon's theorem in each band a,b,c and so that in each of these bands, the best compromise be achieved regarding the value of the optimum sampling frequency resulting from sub-sampling:

On one hand this sampling frequency shall advantageously be fairly low, in particular to achieve good spectral resolution, that is low resolution. Low resolution is a condition which is favorable to subsequent processing, if called for, by rapid Fourier transform or by computing the spectral power density. In this respect it is known that spectral resolution is proportional to the sampling frequency.

On the other hand, it is desirable that the sampling frequency be fairly high in order to avert spectral warpings in subsequent processing, and that the time of observation be shorter in order to more rapidly detect near-targets of which the signatures shall be in higher frequency band.

Splitting the band into frequency channels provides a compromise between a low sampling frequency and a high sampling frequency for each channel. The higher the number of frequency channels, the easier it will be to achieve this compromise.

The variation of magnetic field due to the presence of the submarine can be resolved into a weighted sum of several basic functions relating to the geometry of the path followed by the submarine relative to the buoy, and this is made use of in the circuit 216 detecting the target submarine.

The path followed by the submarine being unknown beforehand, a predicted path is arbitrarily selected and the received signal is projected on a set of functions relating to said predicted path, whereupon the projected energy is calculated as the sum of each projection. If the energy so projected exceeds a given low threshold, it means that the actual submarine path coincides with the arbitrarily selected predicted path. If the projected energy remains less than the threshold, another predicted path is selected, and so on, for a set of possible paths until the projected energy exceeds the low threshold, in which case the submarine has been detected.

Applicant has shown that the path geometry enters the computation of the projected energy only in the form of the ratio V/D already defined in relation to FIG. 8 and the horizontal distance E between the submarine 8 and the geometric projection point of the sensitive part 15 on this submarine's path. In order to try other paths, it suffices therefore to try other combinations of values of the pair E and V/D using a certain grid until the projected energy exceeds the threshold.

Obviously the grid may not be too coarse, in which case there would a danger that a submarine of which the V/D ratio for instance is near the middle of the segment joining the two nearest V/D grid points might not be seen Applicant has shown that a grid sized in V/D in geometric progression at a ratio of 0.5 and starting from 0.05 offers good results, so that the V/D values are as follows:

0.05; 0.025; 0.0125; 0.00625; 0.003125.

Again applicant has shown that once a V/D value has been selected, a good choice of the time window for projecting the received signal on the basic functions is the time window of which the lower limit is −3D/V and of which the upper limit is +5D/V.

This allows taking into account the distortion and delay introduced by the high-pass filter 111+112 eliminating the drifts.

Be it borne in mind that it is not important to precisely know the path of a submarine in its detection process, that is the accurate knowledge of V/D and of E is not critical, where it is desired to ascertain the presence or absence of a target submarine near a given buoy.

In the above description, the submarine detection system comprises at least three buoys. Obviously the invention applies to any system comprising a plurality of at least three detector elements sensitive to the presence of the target in their respective vicinities and distributed in a surveillance zone.

Again, and for the sake of clarity, the various system functions were discussed in block form. It is clear nevertheless that several of them may be reduced to practice in a single circuit, in particular as regards computation which may be carried out by a calculator or computer.

Lastly the method of the invention was described in reference to submarine detection but it applies just as well to detecting any other target, whether surface or submerged vessels.

I claim:

1. A method of detecting a target using a system of three detector elements individually sensitive to the target presence in respective vicinities thereof, the detector elements distributed in a surveillance zone, said method comprising the steps of:
   forming first differences of respective pairs of outputs of the detector elements taken in pairs;
   filtering said first differences to form corresponding filtered signals;
   forming second differences by subtracting from each first difference a filtered signal corresponding to another difference;
   controlling said filter to minimize a value of the second differences in the absence of a target; and
   detecting the target in response to said second differences.

2. The method according to claim 1, wherein said filter is an adaptive filter, said method further comprising the steps of:
   controlling coefficients of said adaptive filter in response to a value of a respective second difference; and
   fixing the values of said coefficients in response to detecting a target.

3. A system for detecting an object comprising: first, second and third sensors responsive to the object for supplying respective sensor output signals; and
   first, second and third detector means, each receiving said first through third sensor output signals and including
   (i) first stage subtractor means for forming a pair of first difference signals of different respective pairs of said first through third sensor output signals,
   (ii) controller means responsive to said pair of first difference signals for supplying a control signal,
   (iii) filter means receiving one of said pair of first difference signals and, responsive to said control signal, adaptively filtering said one first difference signal to supply a filtered first difference signal,
   (iv) second stage subtractor means for forming a second difference signal of the other of said pair of first difference signals and said filtered first difference signals to supply a noise suppressed signal, and
   (v) detection means receiving said noise suppressed signal for supplying a respective object detection signal.

4. The system according to claim 3 wherein said first, second and third sensors comprise magnetometers.

5. The system according to claim 3 further including a fourth sensor and fourth detector means wherein each of said detector means receives said first through fourth sensor output signals, said first stage subtractor means forming a triplet of first difference signals of different respective pairs of said first through fourth sensor output signals, said controller means responsive to pairs of said first difference signals for supplying first and second control signals, said filter means receiving one of each of said pairs of first difference signals and, responsive to said first and second control signals, supplying respective filtered first difference signals, said second stage subtractor means forming said second difference signals of one of said pairs of first difference signals and one of said first difference signals and forming a second difference signal of said first difference signal and the other of said first difference signals.

6. A system for detecting an object comprising:
   first, second and third sensors responsive to the object for supplying respective sensor output signals;
   means for subtractively combining different pairs of said first through third sensor signals to supply first through third difference signals;
   means for adaptively filtering respective ones of said difference signals in response to said respective one and another of said difference signals to supply respective first through third filtered signals;
   means for subtractively combining respective ones of said first through third filtered signals with respective ones of said first through third difference signals to supply first through third processed signals; and
   means for detecting said processed signals to detect the object.

7. A system for detecting an object comprising:
   sensor means responsive to the object for supplying first, second and third sensor output signals;
   means for subtractively combining, in pairs, said first and second, second and third, and third and first sensor output signals for supplying respective first, second and third difference signals;
   means responsive to pairs of said first and second, second and third and third and first difference signals for supplying first, second and third control signals, respectively;
   means responsive to said third, first and second control signals for adaptively filtering said first, second and third difference signals, respectively, to supply respective first, second and third filtered signals;
   means for subtractively combining, in pairs, said first difference signal and said second filtered signal, said second difference signal and said third filtered signal, and said third difference signal and said first filtered signal, to supply first, second and third processed signals; and
   means for detecting said first, second and third processed signals to detect the object.

8. A system for detecting an object comprising: first, second and third sensors responsive to the object for supplying respective sensor output signals;
   first detector means receiving said first through third sensor output signals and including
   (i) means for forming differences of said first and second sensor output signals and said second and third output signals for respectively supplying first and second difference signals,
   (ii) means responsive to said first and second difference signals for supplying a first control signal,
   (iii) means receiving said second difference signal and, responsive to said first control signal, adaptively filtering said second difference signal to supply a first filtered difference signal,
   (iv) means for forming a third difference signal of said first difference signal and said first filtered difference signal to supply a first noise suppressed signal, and
   (v) detection means receiving said first noise suppressed signal for supplying a first object detection signal;
   second detector means receiving said first through third sensor output signals and including
   (i) means for forming differences of said second and third sensor output signals and said third and first sensor output signals for respectively supplying fourth and fifth difference signals, (ii) means responsive to said fourth and fifth difference signal for supplying a second control signal, (iii) means receiving said fifth difference signal and, responsive to said second control signal, adaptively filtering said fifth difference signal to supply a second filtered difference signal, (iv) means for forming a sixth difference signal of said fourth difference signal and said second filtered difference signal to supply a second noise suppressed signal, and (v) means receiving said second noise suppressed signal for supplying a second object detection signal; and third detector means receiving said first through third sensor output signals and including (i) means for forming differences of said third and first sensor output signals and said first and second output signals for respectively supplying seventh and eighth difference signals, (ii) means responsive to said seventh and eighth difference signals for supplying a third control signal, (iii) means receiving said eighth difference signal and, responsive to said third control signal, adaptively filtering said eighth difference signal to supply a third filtered difference signal, (iv) means for forming a ninth difference signal of said seventh difference signal and said third filtered difference signal to supply a third noise suppressed signal, and (v) means receiving said third noise suppressed signal for supplying a third object detection signal; and means responsive to said first, second and third detection signals for detecting the object.

9. A method of detecting an object comprising the steps of:

receiving first, second and third sensor output signals responsive to the object;

subtractively combining pairs of said first through third sensor signals to supply first through third difference signals;

adaptively filtering respective ones of said difference signals in response to said respective one and another of said difference signals to supply respective first through third filtered signals;

subtractively combining respective ones of said first through third filtered signals with respective ones of said first through third difference signals to supply first through third processed signals; and detecting said processed signals to detect the object.

* * * * *